T. L. GREEN.
WIRE CUT SOFT CAKE MACHINE.
APPLICATION FILED FEB. 25, 1909.

970,370.

Patented Sept. 13, 1910.

Witnesses:
Horace H. Crossman
Robert H. Kammler

Inventor:
Thomas L. Green.
by Emery & Booth
attys.

T. L. GREEN.
WIRE CUT SOFT CAKE MACHINE.
APPLICATION FILED FEB. 25, 1909.

970,370.

Patented Sept. 13, 1910.

Witnesses:
Horace H. Crossman
Robert H. Kammler

Inventor:
Thomas L. Green
by Emery & Booth
Attys.

T. L. GREEN.
WIRE CUT SOFT CAKE MACHINE.
APPLICATION FILED FEB. 25, 1909.

970,370.

Patented Sept. 13, 1910.
6 SHEETS—SHEET 6.

Witnesses:
Horace H. Crossman
Robert H. Kammler

Inventor:
Thomas L. Green.
by Emery & Booth
attys.

UNITED STATES PATENT OFFICE.

THOMAS L. GREEN, OF INDIANAPOLIS, INDIANA.

WIRE-CUT SOFT-CAKE MACHINE.

970,370.   Specification of Letters Patent.   Patented Sept. 13, 1910.

Application filed February 25, 1909. Serial No. 480,057.

*To all whom it may concern:*

Be it known that I, THOMAS L. GREEN, a citizen of the United States, residing at Indianapolis, county of Marion, State of Indiana, have invented an Improvement in Wire-Cut Soft-Cake Machines, of which the following description, in connection with the accompanying drawings, is a specification, like letters on the drawings representing like parts.

My invention relates to biscuit and other machines for cutting or manipulating plastic material or dough, and more particularly to what are known in the art as machines of the wire-cut soft cake type.

My invention may be readily understood by reference to the following description of an illustrative embodiment thereof shown in the accompanying drawings wherein,—

Fig. 5 is a plan taken on line 5—5, of Fig. 1; Fig. 5$^a$ is a side elevation taken on the dotted line 5$^a$—5$^a$ of Fig. 5 looking in the direction of the arrow.

Figures 3, 4:
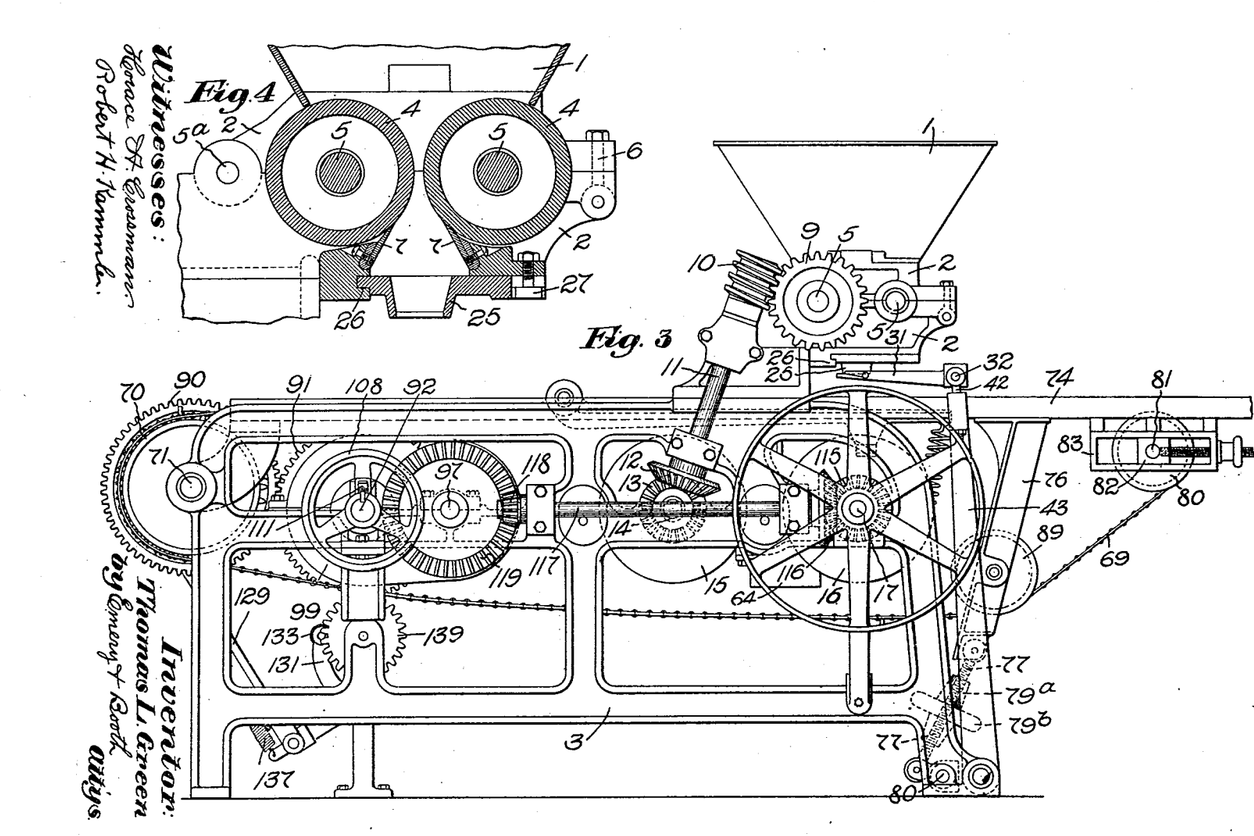
Fig. 3 is a rear elevation of the machine shown in Fig. 1.
Fig. 4 is an enlarged sectional detail taken on the dotted line 4—4 of Fig. 6.
Figures 6, 7, 8:
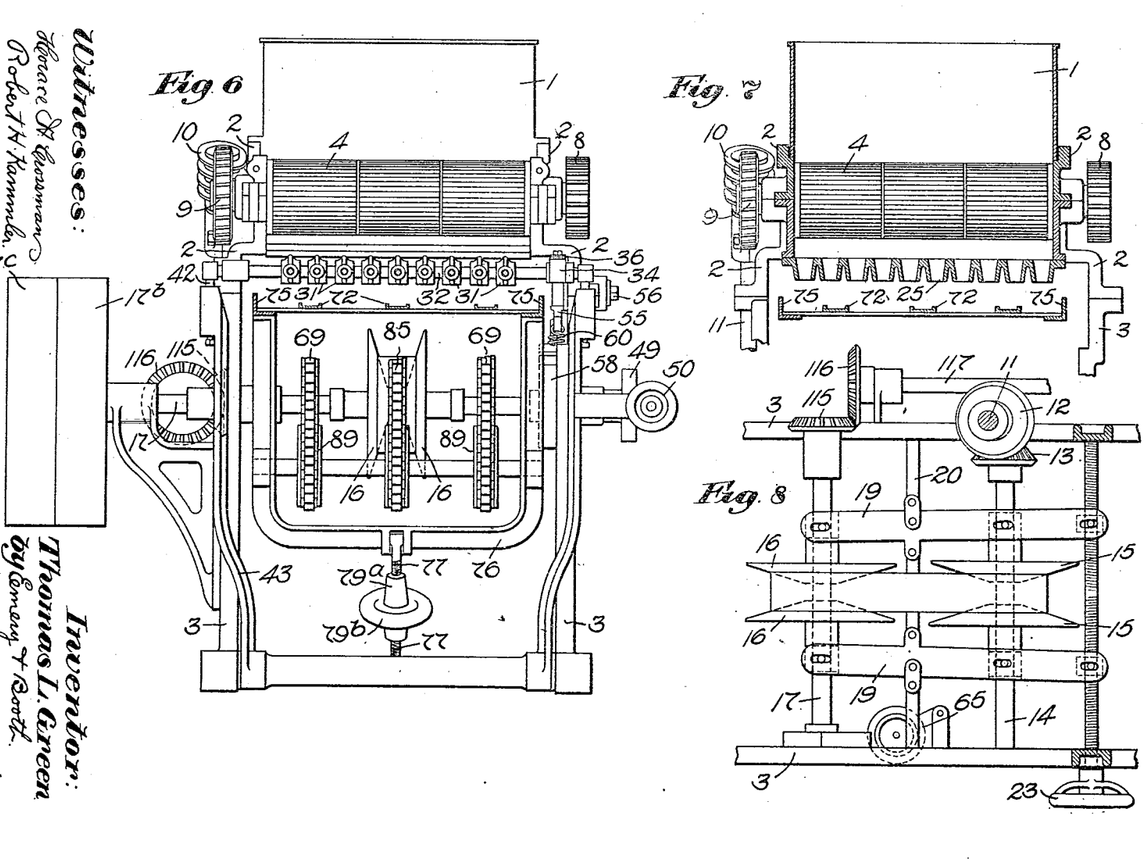
Fig. 6 is a section taken on the dotted line 6—6 of Fig. 1 looking toward the right.
Fig. 7 is a section taken on the dotted line 7—7 of Fig. 1.
Fig. 8 is a plan of a variable speed mechanism used in the machine.

The machine shown herein embodying my invention comprises a hopper 1 (see Figs. 1, 2 and 3) for feeding dough or other plastic material, said hopper resting on the top of a two part base 2 supported on frames 3. This hopper (see Figs. 4 and 6) is provided with corrugated feed rollers 4 fast on shafts 5 journaled in said base 2. As above stated this hopper base is made of two parts and herein these parts are arranged one above the other, hinged together as at 5$^a$ and divide the bearings of said feed rolls horizontally. Said parts may be held when closed by swing locking bolts 6. These rolls may be readily removed by unlocking said bolts and swinging back the upper part of said base, the hopper having been first removed. To prevent adherence of the dough to said feed rolls the latter are provided with scrapers 7 (see Fig. 4) mounted on the hopper base and inclined upwardly and inwardly a short distance, presenting sharp edges contiguous to said feed rolls and leaving the adjacent coöperating feeding surfaces of said feed rolls largely uncovered to furnish an extended frictional surface to engage and feed the dough therethrough. Said feed rolls are shown as toothed or corrugated in sections, separated by ring like scraper supporting surfaces to afford a more effective feed.

The feed rolls 4 are driven continuously by intermeshing gears 8 (Fig. 1) fast on the ends of the feed roll shaft 5, the opposite end of one of said shafts being driven by a worm gear 9, (see Fig. 3) fast thereon meshing with a worm 10 fast on the upper end of an inclined shaft 11 journaled outside of one of said frames 3 in bearings on said hopper base and frames respectively. This inclined shaft is driven at its lower end by a bevel gear 12 fast thereon meshing with a bevel gear 13, fast on the end of a shaft 14 journaled in bearings in said frames 3. The speed of said dough feed rolls may be varied by any suitable variable speed mechanism. Herein said shaft 14 (see Fig. 8) is driven by the well known Reeves variable speed transmission. This transmission is here typified by the usual adjustable friction cones 15, splined to said shaft 14 and driven by a suitable belt, from suitable adjustable cones 16 fast upon a driving shaft 17 journaled on the frames. These cones may be adjusted toward and from each other to vary the relative effective diameters thereof by levers 19 fulcrumed on a bar 20 supported by said frames 5 between said driving and driven shafts and connected at opposite sides of said fulcrum with and to actuate said friction cones. These levers may be oppositely and simultaneously rocked to spread the cones of one and to close the cones of the other of said shafts by a shaft 21 journaled in said frames 5, said shaft being turned by a hand wheel 23 to spread and draw together the cones in the usual manner as desired. By this variable speed mechanism the dough feed rolls may be given a wide range of speed with gradual gradations, even while they are rotating and without the usual necessity of stopping the machine to substitute change parts. The main driving shaft 17 is provided with fast and loose pulleys 17<sup>b</sup> and 17<sup>c</sup>. The dough passing through said feed rolls may be fed through any suitable die. Herein a die 25, comprising a series of cups (see Figs. 1, 3 and 7) is removably supported at one side on a shelf 26 in the hopper base 2, its opposite side being secured to said base, preferably by T-headed bolts 27. The dough from the feed rolls issues through and projects below these cups and is cut or sliced into cakes by a cutter adapted to wipe or move quickly past the ends of said cups. The dough used in this class of work is usually soft without the consistency of the dough used in making soda and similar crackers and therefore must be more carefully cut and deposited. To this end I have provided a mechanism for cutting and accurately depositing the cakes and which I will now describe.

Figures 5, 5A:
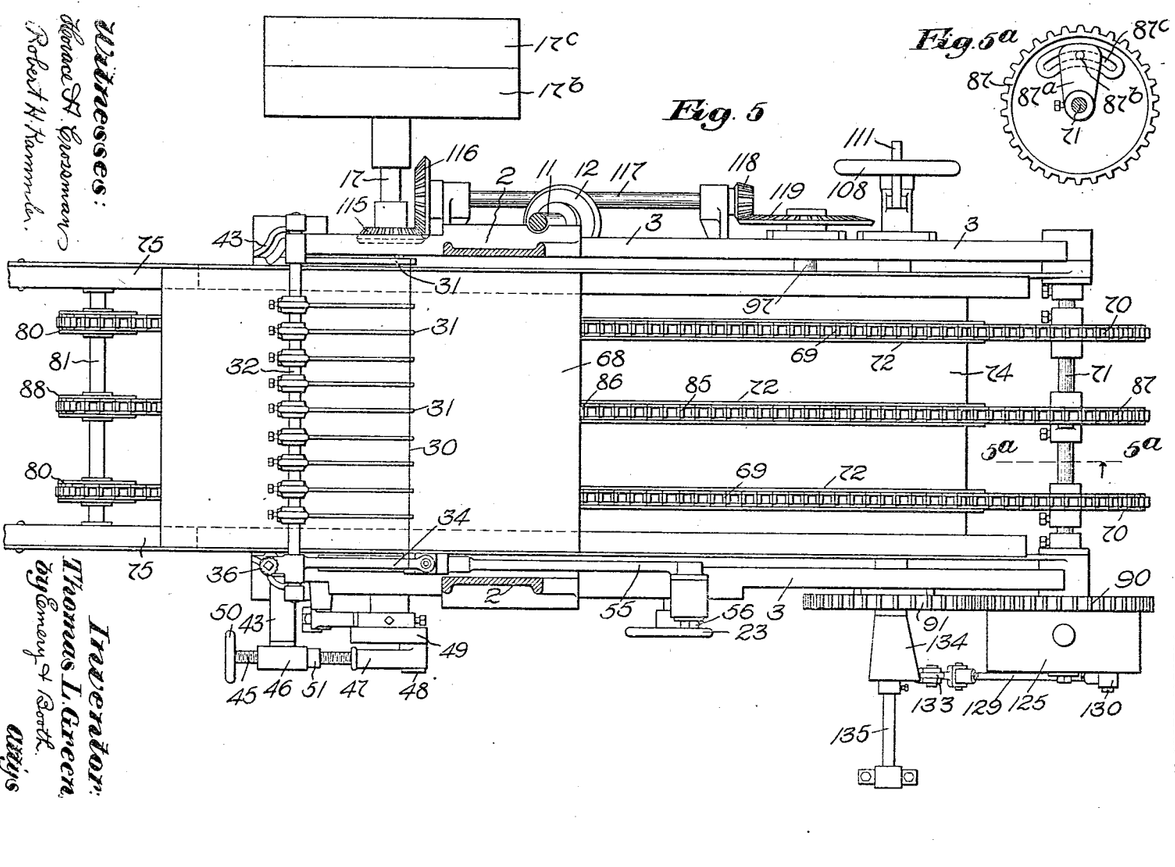
Figures 12, 13, 14, 15, 16, 17:
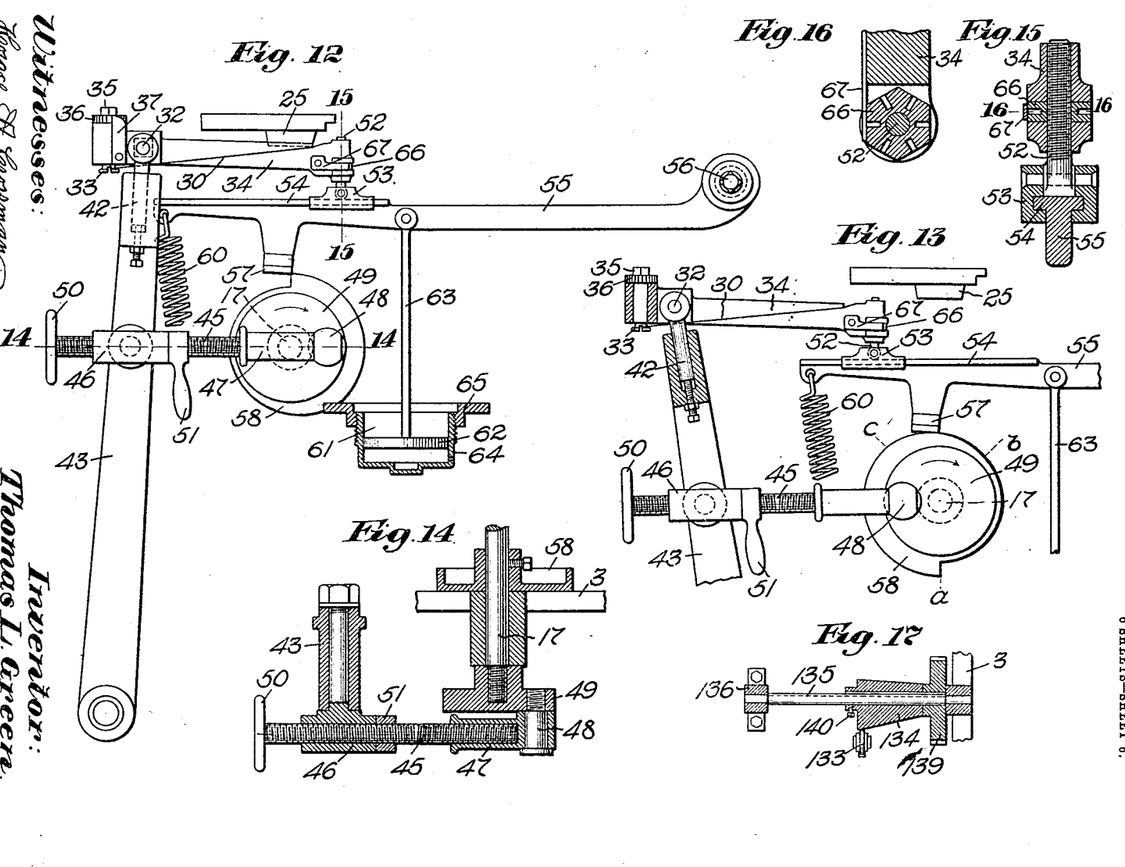
Fig. 12 is a view of parts of the machine isolated from their supporting frame.
Fig. 13 is a view showing the parts in Fig. 12 in a different position.
Fig. 14 is a sectional detail taken on the dotted line 14—14 of Fig. 12.
Fig. 15 is a sectional detail taken on the dotted line 15—15 of Fig. 12.
Fig. 16 is a sectional detail taken on line 16—16 of Fig. 16.
Fig. 17 is a sectional detail taken on the dotted line 17—17 of Fig. 1.

The cutter employed herein (see Fig. 5) comprises a cutter wire 30 (see Fig. 5) which is stretched across the notched ends of a series of spaced supporting fingers 31 adjustably mounted on a rock shaft 32. One end of said wire is secured on the outside of one of the end fingers, the other wire end being carried first through a notch in the outer end of an arm 34 (see Fig. 5,) thence (see Fig. 12) carried along the outer side of said arm to and through the slotted end of a pin 33, mounted in the rear end of said arm 34, the latter being also mounted on said rock shaft 32. This pin 33 may be turned to stretch or take up said cutter wire by a squared head 35 on the upper end thereof, said head being held in its adjusted positions by a ratchet 36 thereon having a spring locking dog 37. The wire finger carrying shaft 32 (see Figs. 1, 6 and 12) is journaled in adjustable extensions 42 in the upper ends of rocker arms 43 (see Fig. 1) the lower ends of which are fast to a shaft 44 journaled at one end of the machine in bearings in the frame. These rocker arms may be oscillated by a connecting rod 45 (see Figs. 1 and 12) threaded into a sleeve 46 pivoted on one of said rocker arms and is oppositely threaded into a head 47 on a crank pin 48 projecting from the face of a disk 49 fast to an outwardly projecting end of the main shaft 17 heretofore referred to. This oppositely threaded rod may be turned in said sleeve and head by a hand wheel 50 and be held in its adjusted positions by a hand locking nut 51. It will be apparent that as the main shaft rotates the rocker arms will receive an oscillatory movement through its connecting rod 45. By this adjustment the location of the cutter wire may be varied to accommodate dies of different sizes or position.

To assist in the deposit of the cakes cut and contribute to their fall, it is desirable to drop the cutter wire abruptly at the finish of its cut. To this end the outer end of the wire shaft stretcher arm 34 (Fig. 12) is enlarged to receive a vertical screw 52 which is pivoted at its lower end to a cross head 53, mounted to slide on a guide 54 upon a wire drop arm 55. This arm is pivoted on a stud 56 projecting from one of said frames 5, and near its outer end is provided with a tappet or follower 57 alternately lifted and dropped by a cam 58 fast on the drive shaft 17. As stated it is desired to give the wire a sudden drop simultaneously with the completion of the cutter stroke. The doughs used in machines of this class are very soft and as a result as soon as the cutter wire severs a portion of a cake from the dough mass issuing from the die, this portion may start to fall before the cake is entirely cut and ordinarily the cake would be tilted more or less and the edge first cut would strike the pan or other surface placed to receive it before the edge last cut, with the danger of deforming the cake. I am to overcome this objection by accelerating the drop of the edge last cut so that the cake will be dropped squarely. In order to do this the wire after completing its cut and while still contiguous to the cake just cut is given a quick drop carrying the cake edge positively with it, thereby causing the edge last cut to overtake the edge first cut and the cake to be evenly deposited. I have obtained this sudden drop herein by an abrupt step in said cam 58 so that when the cam has rotated to the position shown in Fig. 12 the flat faced tappet or follower is brought to the verge of the top of the cam step. The continued rotation of said cam in a clockwise direction will suddenly withdraw any cam supporting surface out from under said follower and the latter will drop abruptly and with it the wire drop arm, the wire supporting arms and the cutter wire, thus furnishing the accelerated drop desired. To give the wire a quicker drop than it would receive by the mere force of gravity on its supporting parts a spring 60 is attached at its upper end to the outer free end of said wire drop arm and at its lower end to a portion of the machine frame. The cutter wire in its drop preferably does not continue with the cake cut during its entire drop, but after the cake has been accelerated a certain distance, the wire is suddenly arrested in its downward movement, thereby flipping or separating the cake therefrom. This arrest may be conveniently obtained by a dash pot 61 (Figs. 1 and 12) having a plunger 62 therein connected to said wire drop arm by a rod 63. The limit of said drop may be varied by adjusting said dash pot vertically, the latter comprising a cup 64, threaded into a ring 65 which is attached to the machine frame, said cup being adjusted by an integral head projecting from the bottom thereof. The use of a dash pot as above described so cushions the drop of said parts as to cushion the drop without damage when the machine is operating at a high rate of speed.

It will be observed that the cam and crank pin are so timed, (see Fig. 12) that when the crank has brought the cutter wire to the finish of its cutting stroke the cam will have brought its step into position simultaneously to drop said wire as described. This relation will be maintained whatever the location of the cutter wire stroke, such as when changed for the different sized dies. The cam is so formed that during the period when the cutter wire is returning for a fresh cut over the cakes already cut and deposited, it will have little or no vertical movement, the tappet then following the cam surface a—b (see Fig. 13) of substantially uniform radius, the wire also traveling a sufficient distance beneath said die to clear the dough, which meanwhile continues to be fed therethrough. When the tappet is following the inclined cam surface b—c, the wire is quickly lifted and the follower will then rest on the surface c—a which is also of substantially uniform radius, so that soon after the wire has started on its forward or cutting stroke it will be moving in a substantially horizontal line to pass or wipe accurately across the rims of the die cups to cut cakes of uniform thickness from the dough issuing therefrom. To accurately position the cutter wire vertically with respect to the die cups, the outer enlarged end of the stretcher arm head is bifurcated to receive an adjusting nut 66, (see Figs. 15 and 16) which may be turned to move said arm up or down on said screw 52, said nut being held in its adjusted positions by a spring 67 pressing against any one of the flat faces of said nut. If the wire did not drop with the cakes it would need an excess or over travel to give the cakes time to fall without interference from the wire on its return stroke. It will be apparent that by my improved construction any over travel or excess is eliminated, the drop of the cakes being hastened, thereby resulting in increased speed and output at the same time producing an accurate and perfect product. The cutter adjustments adapt it to a wide range of work and are simple, easy to make and readily accessible. The cakes cut from the dough issuing through said die may be deposited on any suitable receiver. Herein the cakes drop on to pans 68, (see Fig. 5) fed by a carrier comprising belts or endless chains 69, passing around sprocket wheels 70 (see Figs. 1, 3 and 5) fast to the carrier driving shaft 71 journaled in bearings at one end of the machine frame. These chains travel on channel bars 72 (see Fig. 6) toward the opposite or left hand end (Fig. 1) of the machine, said bars being carried by the adjustable carrier table 74 including longitudinally extended long side bars 75, pivoted at one end of the machine on said sprocket wheel shaft 71 and at the opposite end of the machine mounted on a yoke 76 (see Figs. 3 and 6). This yoke is supported and may be adjusted by oppositely threaded screws 77, one of which is pivoted to said yoke and the other to an arm fast on a shaft 79 journaled in said frames. These screws are connected by a turnbuckle 79ª also having opposite threads and may be turned by a hand wheel 79ᵇ thereon to adjust said yoke vertically as desired. The pan carrier sprocket chains 69 pass also about pulleys 80 at the opposite or delivery end of the machine at the right of Fig. 3 fast to a shaft 81, said shafts being journaled in blocks 82 which may be adjusted in the guides 83 depending from said table side frames to tighten said chains as desired. The pans rest upon said guide chains 69 and may be fed positively forward by a sprocket chain 85 located between said pan carrier chains (see Figs. 1 and 5) and having feeding lugs 86 spaced distances equal to the pan lengths, said chains being passed about a driving sprocket wheel 87 fast on said sprocket shaft 71, thence to the delivery end of the machine to and about a pulley 88 on said pulley shaft 81 and an idler pulley 89 mounted on said table adjusting yoke. Said sprocket wheel 87 (see Fig. 2) while fast on its driving shaft is adjustable thereon through an arm 87ª fast on said shaft and provided with a clamping bolt 87ᵇ extended through a segmental slot 87ᶜ (see Fig. 5ª) in said sprocket wheel. By this adjustment the pan drive chain may be adjusted independently of the carrier driving mechanism to properly position said pans beneath said die. The carrier may be driven through its sprocket shaft 71 by providing said shaft at one of its ends, (see Fig. 2) with a spur gear 90 driven by a spur gear 91 (see Fig. 1) splined on a shaft 92 adjacent and parallel to said shaft 91 and journaled in bearings in said frames.

It will be apparent that if large cakes are being made the carrier and pans will of course, need to travel more rapidly than when small cakes are being made. To provide a variety of speeds for this purpose the carrier is herein driven by a variable speed mechanism which I will now describe.

Figures 9, 10, 11:
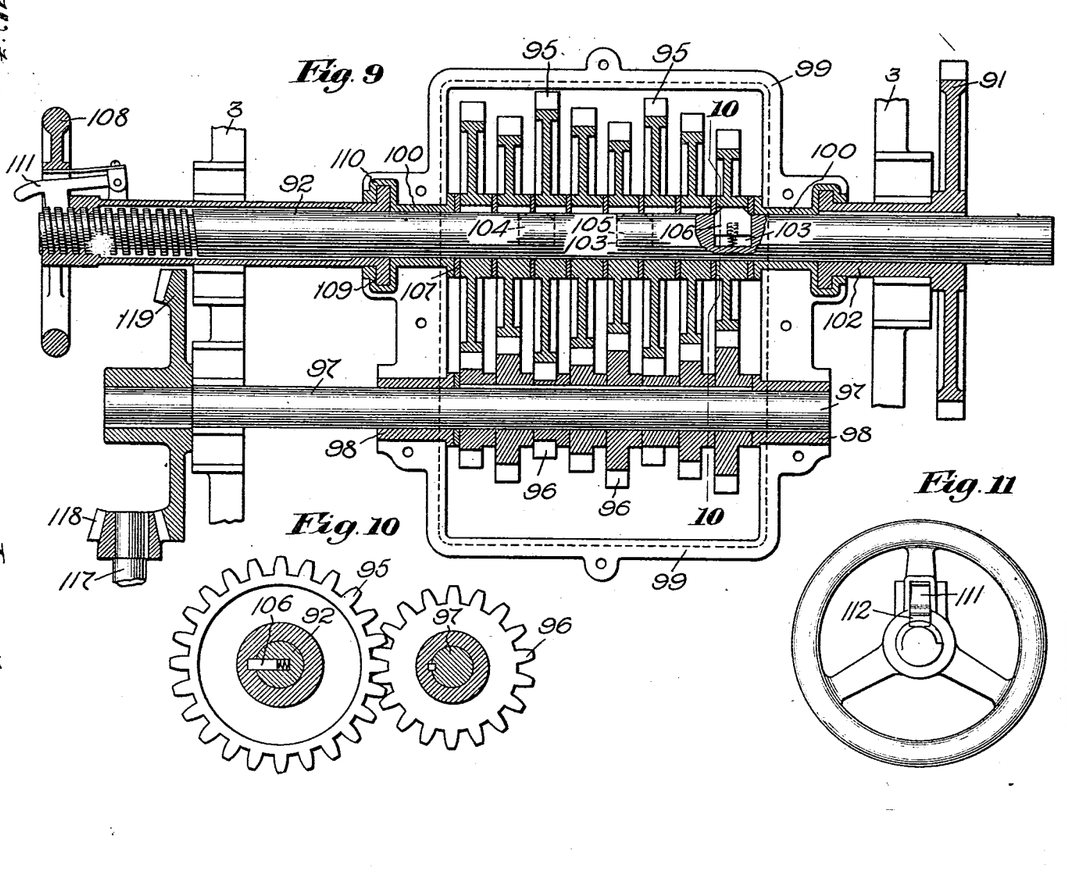
Fig. 9 is an enlarged section taken on the dotted line 9—9 of Fig. 1.
Fig. 10 is a sectional detail taken on the dotted line 10—10 of Fig. 9.
Fig. 11 is a detail of the mechanism shown in Fig. 9.

Referring to Fig. 9, the carrier driving shaft 92 may be given a variety of speeds by a plurality of gears 95 of various sizes loosely mounted thereon and meshing with various sized gears 96 fast to a driving shaft 97 journaled in bosses 98 projecting from a two part casing 99 located between said frames and inclosing the gears on said shaft 6. This casing is provided also with bosses 100 to receive said shaft 92. To prevent axial movement of said gears 91, but permit said shaft 92 to slide axially therethrough, said gear 91 is provided with an inwardly extended hub 102 having a flange 102' rotating in an annular groove in one of said casing bosses. Any one of said loosely mounted driven gears 95 may be connected to the shaft 92 to transmit a given speed thereto from said driving shaft 97 by making the driven shaft 92 (Fig. 9) movable longitudinally in its bearings, providing the same with a plurality of pockets 103 containing spring pressed keys 104, 105 and 106, which tend to project from said shaft to engage corresponding key-ways or the gears 95 thereon when said keys and key-ways are brought into registration. These keys have inclined cam ends and are spaced such distances that only one of said keys at a time will come into registration with one of said key-ways, the other keys being depressed by the engagement of their respective cam ends with washers 107 on said shaft and interposed between the adjacent gears 95. Said shaft may be moved longitudinally to bring said keys in position to enter said key-ways by a hand wheel 108 at the left of Fig. 9, having its hub threaded on said shaft 96 and itself restrained from longitudinal movement by lengthening its hub and providing the inner end thereof with a flange 109, said flange being rotative in an annular groove 110 in one of said casing bosses. To adjust the shaft 92 longitudinally the hand wheel is rotated and being itself held from axial movement will screw said shaft through its threaded hub to adjust said keys to connect the desired gears to said shaft, and after the desired adjustment is obtained it is retained by a spring pressed locking pawl 111 adapted to engage a longitudinal groove 112 (see Fig. 11) in said shaft. The driving shaft 97 of this variable speed mechanism (Figs. 3, 5 and 9) is journaled not only in bosses on said casing, but also one end thereof projects outside of said casing through a bearing in the machine frame and is driven from said main shaft 17 by intermeshing bevel gears 115, 116, a horizontal shaft 117 and bevel gears 118 and 119.

Figures 1, 2:
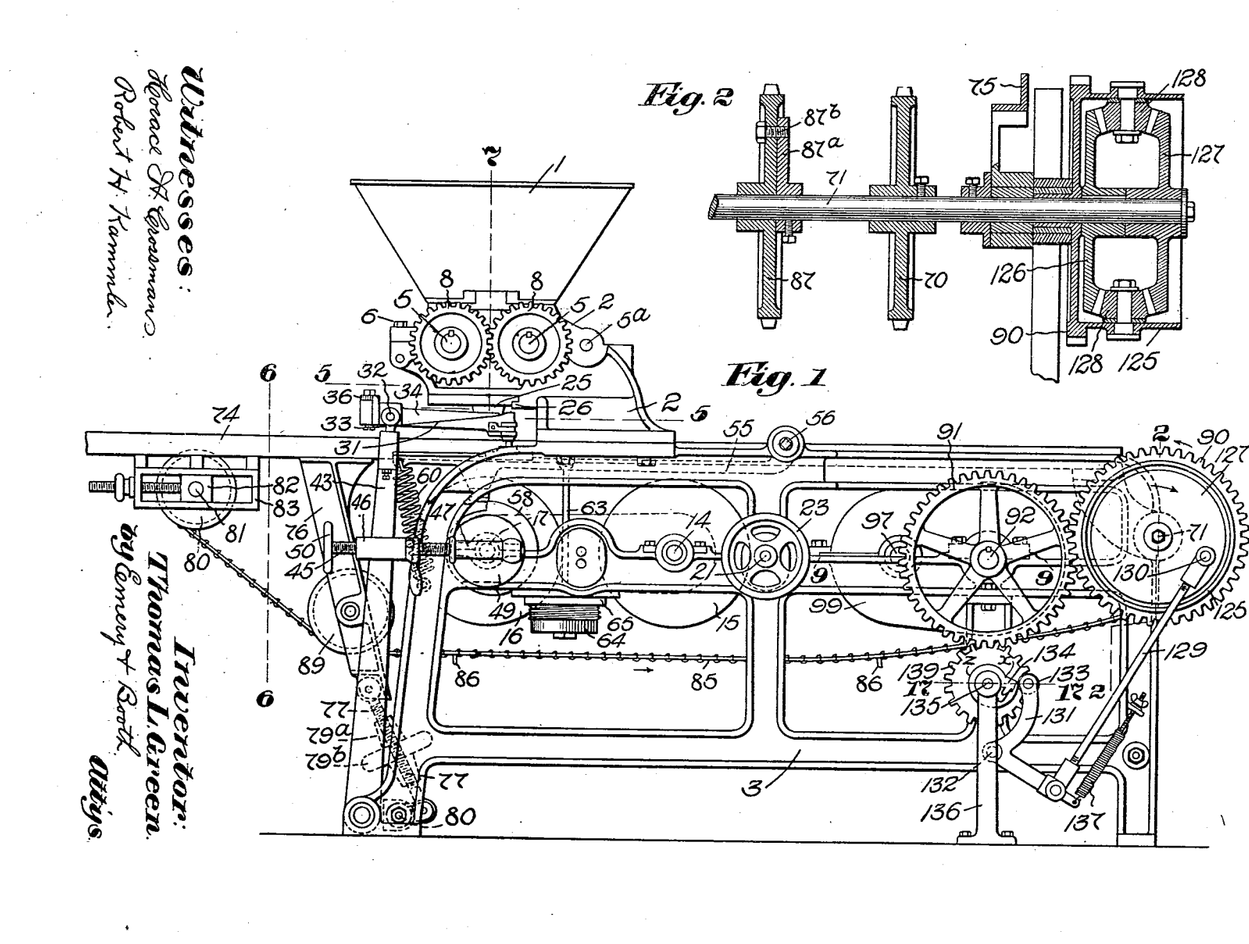
Figure 1 is a front elevation of a machine embodying my invention.
Fig. 2 is an enlarged sectional detail taken on the dotted line 2—2 of Fig. 1.

In addition to the foregoing mechanism for driving the pan carrier at a varying speed to receive cakes of different diameters, it is desirable to provide means whereby at any of said speeds the pan carrier may be given a forward acceleration or skip to bridge or cover the space between the filled pan and the next succeeding pan to be filled, to prevent cakes being deposited on the adjacent pan edges and also to leave the desired selvages adjacent the edges of said pans. Referring to Figs. 1 and 2, the drive from said variable speed mechanism through the driving gear 90 upon the driving sprocket shaft 71 is not transmitted directly to said shaft but indirectly through a differential drive including a barrel 125 projecting from the face of said gear 90 and provided with a plurality of internal bevel pinions 128 meshing with the bevel gears 126, 127 respectively, fast and loose on said shaft. It will be apparent that when the gear 90 and its barrel are rotated the pinions 128 will travel idly around the face of the gear 126 without transmitting rotation thereto but would tend to cause idle rotation of the loose gear 127 if the latter were free to rotate. This gear 127 however is not permitted to rotate freely but is held from continual rotation and controlled by a connecting rod 129 (see Fig. 1), connected at one end to said gear 127 by a pin 130 and at its opposite end to one arm of a bell crank lever 131. This lever is pivoted on a stud 132 projecting from the main frame and is rocked by the engagement of its roller 133 with a cam 134 on a shaft 135 journaled in the main frame and in a bracket 136. The roller 133 is pressed continually to engage the cam 134 by a spring 137 attached at one end to the bell crank 131 and at its opposite end adjustably to the main frame. The cam shaft 135 is provided with a gear 139 fast thereon which is driven from the gear 91 referred to directly above it. The cam 134 is provided with an abrupt face x—y which when it reaches the roller 133 causes the latter, its bell crank and connecting rod 129 to be moved to rock the gear 127 in the direction of the arrow thereon to cause the pinions 128 to transmit to the gear 126 and the carrier an accelerated forward skip such as described. When the cam roller reaches the high point of said abrupt cam face x—y the accelerated movement ceases and thereafter the cam roller gradually and slowly descends the truly spiral cam surface x—z—y to its original position at the foot of said abrupt face in readiness for the next acceleration. The spiral descending face x—z—y of the cam produces a gradual reverse rocking movement of the gear 127 at a uniform rate, which because it is gradual and of uniform rate acts merely to reduce the uniform forward speed of the carrier but without any variation thereof—that is to say—the forward driving movement of the carrier is changed to allow for the intermittent action of the cam face x—y and still furnish the required forward drive to the carrier. In this way the abrupt cam face x—y becomes only effective part of the time and furnishes the periodic skip required. The barrel 125, pinions 128, gear 126, gear 127, rod 129 and bell crank 131 constitute a part of the carrier feeding mechanism and under the influence of the spiral portion of the cam 134 effect the uniform travel of the carrier. The cam face x y operating through this part of the feeding mechanism gives the carrier its periodic forward accelerations. The acceleration or skip should occur each time the pan carrier moves a distance equal to a pan length in order to bridge the spaces between the adjacent pans when passing beneath the die as described. To this end the circumference of the sprocket wheel 87 is preferably equal to the length of a pan and said skip will therefore occur once in each rotation of said sprocket and also once in a rotation of the gear 126 fast to the shaft carrying said sprocket. Since the gear 91 operating through the pinions 128 drives the gear 126 and the sprocket gear 87 at twice the speed of said gear 91, the ratio of the gears 91 and 139 is made as two to one in order that the cam rotation and skip shall occur once in each rotation of said sprocket gear. The amount of selvage adjacent the pan ends will vary according to the number and size of biscuits deposited thereon. This makes it necessary to vary the duration of the pan skip. To this end the cam 134 (see Fig. 17) in addition to its spiral form is made conical having one end smaller and with less throw than its opposite end and is splined to and may be adjusted along its supporting shaft and be held in its adjusted position by a screw 140. The cam may thus be adjusted to furnish the amount of movement of the gear 127 desired. By this simple mechanism the skip is positively effected and may be varied as desired.

In the use of the machine described herein the dough or other plastic material is fed into the hopper 1 through the variable speed continuously driven feed rolls 4 and is forced down through the die beneath. The material projecting through said die is then cut transversely into cakes by the advancing cutter wire 30 which drops quickly at the finish of its cutting stroke carrying with it the cakes cut. The wire in dropping with said cakes on the completion of the cut, accelerates or controls the deposit of the cakes upon the surface beneath. The cutter travel is reduced to a minimum because by dropping the wire with the deposited cakes it becomes unnecessary to prolong the travel beyond the die before it is dropped to avoid interference with the cakes deposited, as would be necessary were the dropping movement of the cutter not accelerated substantially to or beyond the normal drop of the cakes as heretofore. Thus my invention permits of the shortening of the travel of the cutter and the corresponding speeding of the machine. The stroke of the cutter by my invention may be made to occur with such frequency that the dough feed rolls may be driven continuously to feed the dough or other material through said die, as distinguished from driving the feed rolls intermittently as would be necessary without the high speed cutter. The wire preferably does not drop through the entire fall of the cakes but is suddenly arrested by the dash pot 63, which cushions its drop and is adjustable to vary the limit thereof. The length of the stroke of the cutter is constant and is determined by the throw of the crank disk, but its limits may be varied by the adjustable connecting rod 45 to accurately position the cutter stroke with respect to different dies as desired. The cakes thus cut by the wire cutter are deposited on the continuously moving pan carrier traveling beneath said die. The pan carrier table hinged at the left of Fig. 3 may be adjusted vertically at its free end to vary the distance between the die and the deposit or pan surface to facilitate proper deposit of the cakes on the pans according to the speed of the machine, the consistency of the dough and the character of the cakes being cut.

My invention makes possible a simple machine, convenient to operate, permitting of its principal adjustments while the machine is in motion and by the elimination of excess movement and by reason of its novel cutter and deposit mechanism may be run at a high speed and at the same time insure a perfect product.

It will be understood that my invention is not limited to the particular embodiment shown herein, but that various modifications may be made without departing from the spirit of my invention.

Claims:

1. In a machine of the class described, the combination of a forming-die for shaping plastic material, a cutter movable across the die opening and means to impart an accelerated article depositing drop to said cutter at the limit of its cut through the material formed by said die.

2. In a machine of the class described, the combination of a die for shaping plastic material, a cutter movable across the die opening to cut a cake from the material issuing therethrough, accelerating means to impart a cake depositing drop to said cutter at the limit of its cut through the material formed by said die and means to vary the limit of said drop.

3. In a machine of the class described, the combination of a forming die, a cutter movable across the delivery thereof, means to change the level of the cutter, and cushioning means for the latter.

4. In a machine of the class described, the combination of a forming die, a cutter, means to actuate the latter and cushioning means for said cutter.

5. In a machine of the class described, the combination of a forming die, a cutter coöperating therewith, means to drop the latter and means to limit and cushion said drop.

6. In a machine of the class described, the combination of a forming die, a cutter coöperating therewith, means to drop the latter and adjustable means to limit and cushion said drop.

7. In a machine of the class described, the combination of a forming die, a cutter coöperating therewith, means to drop the latter and a dash pot to cushion said drop.

8. In a machine of the class described, the combination of a forming-die for shaping plastic material, a cutter movable across the die opening, means to impart an accelerated article depositing drop to said cutter at the limit of its cut through the material formed by said die, and means to vary the limits of the cutter reciprocation.

9. In a machine of the class described, the combination of a forming-die, a cutter supporting arm, a cutter thereon, means to reciprocate and drop the latter, and cutter adjusting means adjacent the cutter supporting end of said arm vertically to adjust the cutter relatively to said die.

10. In a machine of the class described, the combination of a forming die, a cutter therefor, means to reciprocate and drop the latter at the finish of its cutting stroke, means to vary the limit of said drop, and means to adjust said cutter independently of said drop limiting means.

11. In a machine of the class described, the combination of a forming-die, a wire cutter, a supporting arm therefor and cutter means adjacent the opposite ends of said arm vertically to adjust the latter relatively to said die.

12. In a machine of the class described, the combination of a forming die, a wire cutter and an abrupt drop tappet cam for imparting a cake depositing stroke to said cutter.

13. In a machine of the class described, the combination of a forming die for shaping plastic material, a cutter movable across the die opening, means to impart an accelerated article depositing drop to said cutter at the limit of its cut through the material formed by said die, and a continuously driven, variable speed carrier for receiving said articles.

14. In a machine of the class described, the combination of a forming die, a cutter coöperating therewith, means to impart an accelerated drop to the latter simultaneously with the completion of its cut and a variable speed carrier for receiving the delivered articles.

15. In a machine of the class described, the combination of a forming die, a cutter coöperating therewith, means to drop the latter, means to limit and cushion said drop, a delivery carrier for receiving the articles cut, and variable speed driving means for said carrier.

16. In a machine of the class described, the combination of a forming die, a cutter coöperating therewith, a cake carrier, feeding means therefor, and means operating through said feeding means to give said carrier a periodic forward acceleration.

17. In a machine of the class described, the combination of a forming-die, a cutter coöperating therewith, a continuously movable carrier, feeding means therefor and means operating through the latter to give said carrier a periodic accelerated movement.

18. In a machine of the class described, the combination of cake forming means, a continuously movable carrier to receive the cakes formed, carrier feeding means and adjustable positive means operating through said feeding means to give the carrier a periodic forward impulse of variable extent.

19. In a machine of the class described, the combination of cake forming means, a continuously movable cake carrier, feeding means therefor and differential gear mechanism operating through said feeding means for giving said carrier a periodic forward acceleration.

20. In a machine of the class described, the combination of cake forming means, a continuously movable cake carrier, a differential driving gear therefor and a true spiral cam for controlling said gear.

21. In a machine of the class described, the combination of a hopper, means continuously to feed material therethrough for an indefinite period, means to vary the speed of said feed means without interrupting said feed, a forming die, and a cutter movable with respect to the latter to cut the material issuing from said die into cakes.

22. In a machine of the class described, the combination of a hopper, a forming die therefor, variable speed, continuously operating, feeding means to force material through said hopper, a cutter movable across said die, and means to impart an accelerated article depositing drop to said cutter at the limit of its cut through the material formed by said die.

23. In a machine of the class described, the combination of a hopper, a forming die therefor, a cutter wire, cutter wire supporting means, a crosshead connected thereto, a reciprocable guide for said crosshead, means to reciprocate said wire supporting means and means vertically to reciprocate said guide.

24. In a machine of the class described, the combination of a hopper, a forming die therefor, a cutter wire, its supporting arm and vertically and horizontally mounted rocking arms for giving said wire a cutting stroke and means to drop said cutter at the finish of its cut.

25. In a cake machine, the combination of a forming die, a cutter movable across the delivery therefrom, a cutter guide, means to impart a cake depositing drop to said cutter and means to flip the cake therefrom.

26. In a machine of the class described, the combination of cake forming means, a continuously movable cake carrier, a carrier driving gear, a control gear therefor, a pinion connecting said gears and means to turn said control gear relatively to said driving gear to vary the speed of the latter.

27. In a machine of the class described, the combination of cake forming means, a continuously movable cake carrier, a carrier driving shaft, a differential driving gear therefor and a cam coöperating with said gear to transmit normally a substantially uniform rate of movement to said carrier and periodically an accelerated movement thereto.

28. In a machine of the class described, the combination of cake forming means, a continuously movable cake carrier, a differential driving gear therefor and a cam coöperating with said gear having a spiral portion to transmit a substantially uniform rate of movement to said gear and an inclined portion to transmit periodically an accelerated movement thereto.

29. In a machine of the class described the combination of cake forming means, a continuously movable cake carrier, a differential driving gear therefor and an adjustable tapered cam for controlling said gear and varying the movements thereof.

30. In a machine of the class described, the combination of forming means, a carrier for receiving the material formed thereby, means to impart movement thereto and cam controller means to vary the rate of such movement without interruption of the movement of said carrier.

31. In a machine of the class described, the combination of article forming means, a movable carrier for receiving the material formed thereby and carrier driving means including means to impart at times an accelerated movement to said carrier, and means operable between the accelerations for moving said accelerating means to a position in readiness for a succeeding accelerating operation.

In testimony whereof, I have signed my name to this specification, in the presence of two subscribing witnesses.

THOMAS L. GREEN.

Witnesses:
FREDERICK L. EMERY,
WM. A. OREN.